(12) United States Patent
Suto et al.

(10) Patent No.: US 9,186,986 B2
(45) Date of Patent: Nov. 17, 2015

(54) PROPULSIVE APPARATUS FOR ELECTRIC VEHICLES

(71) Applicant: HONDA MOTOR CO., LTD., Tokyo (JP)

(72) Inventors: Junichi Suto, Utsunomiya (JP); Xingwei Ning, Mooka (JP); Takahiro Suzuki, Shimotsuke (JP)

(73) Assignee: HONDA MOTOR CO., LTD., Tokyo (JP)

( * ) Notice: Subject to any disclaimer, the term of this patent is extended or adjusted under 35 U.S.C. 154(b) by 46 days.

(21) Appl. No.: 13/951,673

(22) Filed: Jul. 26, 2013

(65) Prior Publication Data

US 2014/0033846 A1    Feb. 6, 2014

(30) Foreign Application Priority Data

Aug. 1, 2012    (JP) ................................. 2012-170850

(51) Int. Cl.
*B60W 20/00*    (2006.01)
*B60K 17/04*    (2006.01)
*B60K 1/00*    (2006.01)
*B60K 7/00*    (2006.01)

(52) U.S. Cl.
CPC . *B60K 17/04* (2013.01); *B60K 1/00* (2013.01); *B60K 7/0007* (2013.01); *B60K 17/043* (2013.01); *B60K 2007/0046* (2013.01); *B60K 2007/0061* (2013.01); *Y10T 74/19619* (2015.01)

(58) Field of Classification Search
CPC ... B60K 5/1216; B60K 5/1241; B60W 20/00; B60W 10/08

USPC .................... 180/65.1–65.285, 65.6; 903/909
See application file for complete search history.

(56) References Cited

U.S. PATENT DOCUMENTS

| | | | |
|---|---|---|---|
| 4,460,058 A * | 7/1984 | Welschof et al. ............. | 180/258 |
| 6,820,707 B1 | 11/2004 | Cantemir | |
| 2005/0077137 A1 * | 4/2005 | Nozaki et al. .................. | 192/38 |

FOREIGN PATENT DOCUMENTS

| JP | 2007-261467 A | 10/2007 |
|---|---|---|
| JP | 4379867 B2 | 12/2009 |

OTHER PUBLICATIONS

Japanese Office Action application No. 2012-170850 dated Dec. 17, 2013.
Chinese Patent Office, Chinese Office Action with partial English translation, for corresponding Chinese Patent Application No. 201310285535.3, dated Jul. 3, 2015.

* cited by examiner

*Primary Examiner* — Brodie Follman
*Assistant Examiner* — James Triggs
(74) *Attorney, Agent, or Firm* — Squire Patton Boggs (US) LLP

(57) ABSTRACT

A propulsive apparatus for use in an electric vehicle includes a gear rotatable by a propulsive motor and having first teeth, and a constant velocity joint having an outer member which includes a larger-diameter portion having second teeth on an outer wall surface thereof. The second teeth serve as part of a speed reducer mechanism which is thus interposed between the propulsive motor and the constant velocity joint. When the gear is rotated by the propulsive motor, the propulsive power is transmitted through the speed reducer mechanism to the constant velocity joint for rotation.

5 Claims, 2 Drawing Sheets

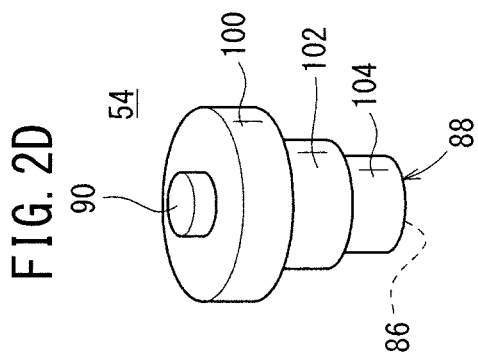
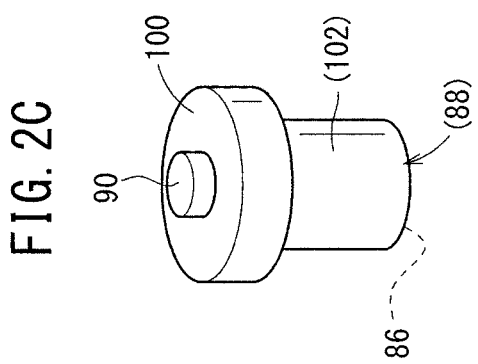
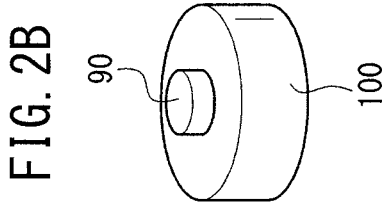
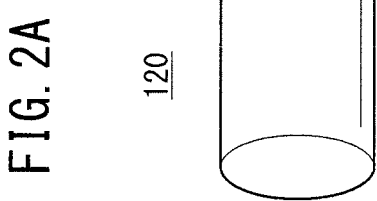

PROPULSIVE APPARATUS FOR ELECTRIC VEHICLES

CROSS-REFERENCE TO RELATED APPLICATION

This application is based upon and claims the benefit of priority from Japanese Patent Application No. 2012-170850 filed on Aug. 1, 2012, the contents of which are incorporated herein by reference.

BACKGROUND OF THE INVENTION

1. Field of the Invention

The present invention relates to a propulsive apparatus for propelling an electric vehicle with at least a propulsive motor used as a propulsive source which is coupled to a drive shaft by a constant velocity joint.

2. Description of the Related Art

Some automobiles which include four-wheeled and two-wheeled vehicles have a propulsive motor as a propulsive source. Such automobiles are exemplified by hybrid vehicles which incorporate both an internal combustion engine and a propulsive motor as propulsive sources and electric vehicles or fuel-cell electric automobiles which incorporate a propulsive motor as a propulsive source.

On the electric vehicles, the rotational propulsive power generated by the propulsive motor is transmitted through a drive shaft to drive wheels, i.e., tires. As a result, the drive wheels are rotated to propel the electric vehicles.

The propulsive motor and the drive shaft are connected to each other by a constant velocity joint. Occasionally, the propulsive motor, the drive shaft, and the constant velocity joint are jointly referred to as "propulsive apparatus" or "power unit". The present applicant has proposed a power unit including a propulsive motor, a speed reducer mechanism, and a constant velocity joint which are housed in a case, as disclosed in Japanese Patent No. 4379867.

SUMMARY OF THE INVENTION

The electric vehicles are relatively complex in structure as they are made up of a greater number of parts than vehicles incorporating only an internal combustion engine as a propulsive source.

It is a general object of the present invention to provide a propulsive apparatus for electric vehicles which is made up of a reduced number of parts.

A major object of the present invention is to provide a propulsive apparatus for electric vehicles which is relatively simple in structure.

According to the present invention, there is provided a propulsive apparatus for use in an electric vehicle, comprising a propulsive motor serving as a propulsive source for the electric vehicle, a drive shaft, a constant velocity joint operatively connecting the propulsive motor and the drive shaft to each other, the constant velocity joint including an inner member fitted over an end of the drive shaft and an outer member housing the inner member therein, a gear rotatable by the propulsive motor, the gear having first teeth and the outer member having a portion with second teeth disposed on an outer wall surface thereof, and a speed reducer mechanism operable in response to rotation of the gear, wherein the portion of the outer member with the second teeth disposed thereon serves as a gear of the speed reducer mechanism.

The outer member of the constant velocity joint is a component of the constant velocity joint and also a component of the speed reducer mechanism. In other words, the outer member doubles as a component of the constant velocity joint and also a component of the speed reducer mechanism. Consequently, the propulsive apparatus is made up of a smaller number of parts than if the speed reducer mechanism is completely separate from the constant velocity joint, and hence is simpler in structure.

For making the outer member of the constant velocity joint function as the speed reducer mechanism, the speed reducer mechanism may include a first gear having third teeth held in mesh with the first teeth, and a second gear having fourth teeth held in mesh with the second teeth. For example, the speed reducer mechanism may include a two-stage helical gear assembly.

The portion of the outer member with the second teeth disposed thereon may be larger in diameter than the second gear for functioning as the speed reducer mechanism.

Alternatively, the outer member may include a larger-diameter portion, the second teeth being disposed on the larger-diameter portion. The speed reducer mechanism thus has an increased gear ratio for a greater gear reduction ratio.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 2A through 2D are perspective views illustrating a process of manufacturing an outer member of a constant velocity joint of the propulsive apparatus.

DESCRIPTION OF THE PREFERRED EMBODIMENTS

Figure 1:
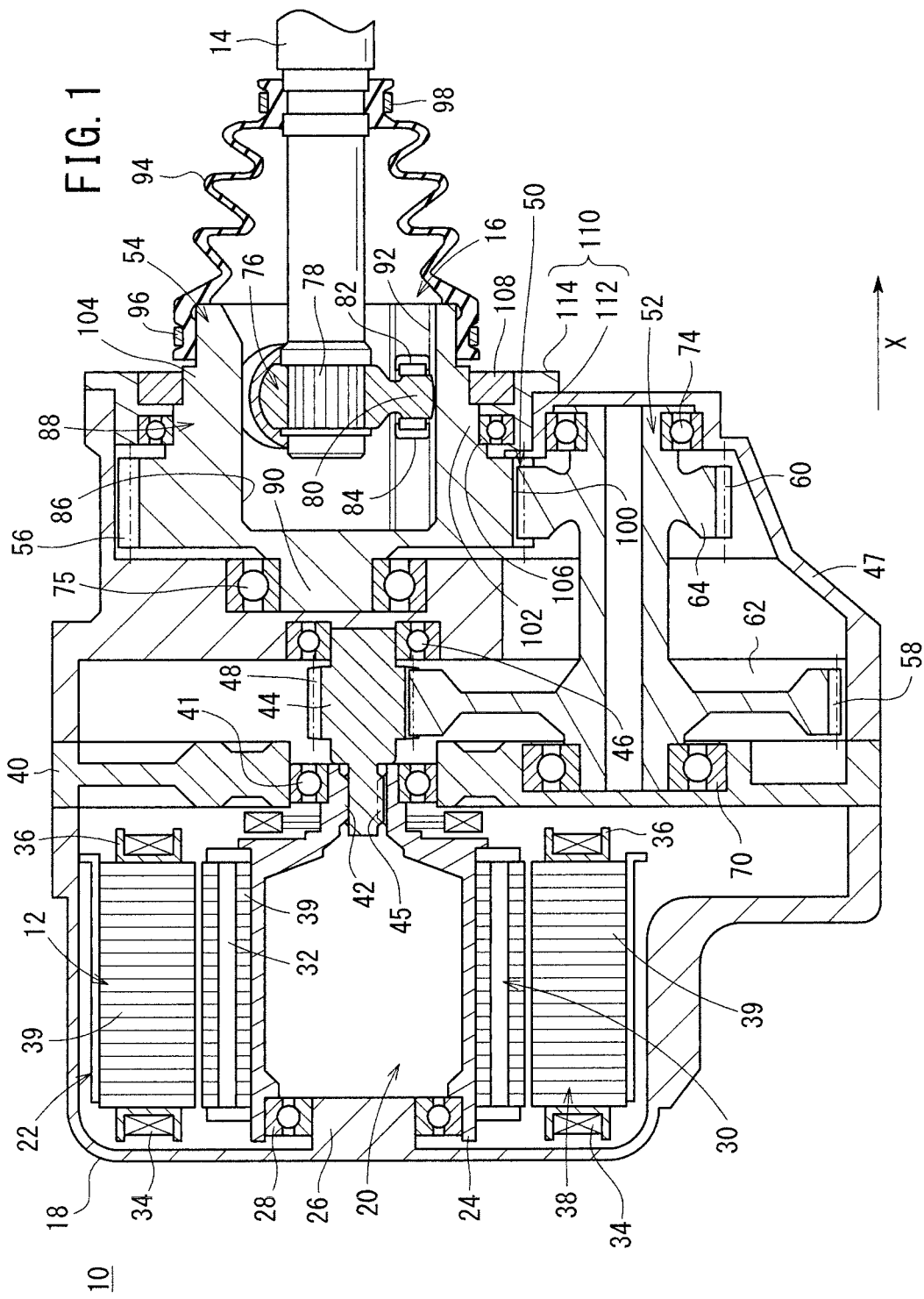
FIG. 1 is a vertically sectional side elevational view of a propulsive apparatus for electric vehicles according to an embodiment of the present invention.

A propulsive apparatus for electric vehicles according to a preferred embodiment of the present invention will be described in detail below with reference to the accompanying drawings.

FIG. 1 shows in vertically sectional side elevation a propulsive apparatus 10 for electric vehicles according to an embodiment of the present invention. As shown in FIG. 1, the propulsive apparatus 10 has a propulsive motor 12, a drive shaft 14 for transmitting the rotational propulsive power from the propulsive motor 12 to drive wheels, not shown, and a constant velocity joint 16 that operatively connects the propulsive motor 12 and the drive shaft 14 to each other. The terms "right" and "left" used below refer to right and left, respectively, in FIG. 1.

The propulsive motor 12 has a rotor 20 and a stator 22 which are housed in a motor case 18. The rotor 20 has a rotor shaft (rotational shaft) 24 with open left and right ends. Although the rotor shaft 24 is illustrated as being of a hollow structure, it may alternatively be of a solid structure.

The motor case 18 has a central cylindrical boss 26 on one end thereof which projects inwardly from the inner wall surface thereof into the rotor shaft 24. The open left end of the rotor shaft 24 is rotatably supported on the central cylindrical boss 26 by a bearing 28.

A rotor yoke 30 is supported on the outer circumferential wall surface of the rotor shaft 24. The rotor yoke 30 has a plurality of magnets 32 arrayed at angularly spaced intervals circumferentially around the rotor shaft 24.

The stator 22 includes stator yokes 38 each of which has an electromagnetic coil 34 wound around a bobbin 36. The stator yokes 38 surround the rotor yoke 30. The electromagnetic coils 34 are supplied with an electric current from a motor energizing circuit, not shown. A reference numeral 39 denotes an electromagnetic steel plate.

The open right end of the rotor shaft 24 is pressed toward a first casing member 40 with a bearing 41 interposed therebetween. The rotor shaft 24 is rotatable about its own axis with respect to the first casing member through the rotor shaft 24 is pressed from the first casing member 40.

The open right end of the rotor shaft 24 has straight axial inner teeth 42 on its inner wall surface which are held in mesh with straight axial outer teeth 45 on a smaller-diameter left end of a gear 44. Therefore, the open right end of the rotor shaft 24 and the small-diameter left end of the gear 44 are splined to each other.

The gear 44 has a larger-diameter right end supported on a second casing member 47 by a bearing 46. The gear 44 has first teeth 48 disposed on the outer circumferential wall surface thereof axially.

The propulsive motor 12 and the constant velocity joint 16 are operatively coupled to each other by a two-stage helical gear assembly 52. Specifically, the constant velocity joint 16 includes an outer member 54 having second teeth 56. The two-stage helical gear assembly 52 and the second teeth 56 jointly make up a speed reducer mechanism 50. The two-stage helical gear assembly 52 has third teeth 58 held in mesh with the first teeth 48 and fourth teeth 60 held in mesh with the second teeth 56.

Specifically, the two-stage helical gear assembly 52 includes a first gear 62 and a second gear 64 which is smaller in diameter than the first gear 62. The first gear and the second gear 64 are integral with each other. The third teeth 58 are disposed on the outer circumferential wall surface of the first gear 62, whereas the fourth teeth 60 are disposed on the outer circumferential wall surface of the second gear 64.

A bearing 70 is interposed between the left end of the two-stage helical gear assembly 52 and the first casing member 40. A bearing 74 is interposed between the right end of the two-stage helical gear assembly 52 and the second casing member 47. Therefore, the two-stage helical gear assembly 52 is rotatably supported on the first casing member 40 and the second casing member 47 by the bearings 70, 74.

The constant velocity joint 16 that is rotatably supported on the second casing member 47 by a bearing 75 is a tripod constant velocity joint. The constant velocity joint 16 has an inner member 76 and the outer member 54 which houses the inner member 76 slidable therein. The constant velocity joint 16 may alternatively be of another type than a tripod constant velocity joint, e.g., a Birfield constant velocity joint.

First splines 78 are disposed on one end of the drive shaft 14. The inner member 76 has a through hole, not shown, defined therein with second splines, not shown, being disposed on the inner circumferential wall surface that defines the through hole in the inner member 76. The inner member 76 is fitted over the end of the drive shaft with the second splines being held in mesh with the first splines 78.

The inner member 76 has three integral trunnions 80 projecting radially outwardly from the outer circumferential wall surface of an annular portion of the inner member 76 and angularly spaced at predetermined angular interval around the annular portion. In FIG. 1, one of the three trunnions 80 is illustrated. Ring-shaped rollers 84 are rotatably mounted on the outer circumferential surfaces of the respective trunnions 80 by respective needle bearings 82.

The outer member 54 has a cup 88 with a bottomed hole 86 defined therein and a shank 90 projecting axially from the closed end of the cup 88. The bearing 75 is interposed between the shank 90 and the second casing member 47.

The inner wall that defines the bottomed hole 86 in the outer member 54 has axial guide grooves 92 in which the rollers 84 roll axially therealong. There are as many guide grooves 92 as the number of trunnions 80, i.e., the number of rollers 84. The guide grooves 92 are angularly spaced at predetermined angular intervals circumferentially along the inner wall and extend axially of the cup 88.

An open end of the outer member 54, i.e., the cup 88, and a portion of the drive shaft 14 are covered with a bellows-shaped boot 94. The boot 94 has left and right ends fastened respectively to the cup 88 and the drive shaft 14 by respective bands 96, 98.

The cup 88 includes a larger-diameter portion 100 on a left end portion thereof as a side wall. The larger-diameter portion 100 is greater in diameter than the second gear 64 and projects radially outwardly as an annular portion. The second teeth 56 are disposed on the outer circumferential wall surface of the larger-diameter portion 100. The larger-diameter portion 100 with the second teeth 56 thus serve as a gear. The second teeth 56 are held in mesh with the fourth teeth 60 of the second gear 64 of the two-stage helical gear assembly 52. When the propulsive motor 12 is energized, the rotor shaft 24 rotates about its own axis, causing the gear 44 to rotate the two-stage helical gear assembly 52 about its own axis. Upon rotation of the two-stage helical gear assembly 52, the outer member 54, the inner member 76, and the drive shaft 14 rotate about their own axes.

The cup 88 also includes, in addition to the larger-diameter portion 100, a medium-diameter portion 102 and a smaller-diameter portion 104 that are arranged in successive positions which are progressively more spaced from the larger-diameter portion 100 toward the right end of the cup 88. The larger-diameter portion 100, the medium-diameter portion 102, and the smaller-diameter portion 104 are successively smaller in diameter in the order named.

A third casing 110 has a tubular portion 112 inserted between the medium- and smaller-diameter portions 102, 104 and the open right end of the second casing member 47. A bearing 106 is interposed between the medium-diameter portion 102 and the tubular portion 112, and a seal 108 is interposed between the smaller-diameter portion 104 and the tubular portion 112. The third casing 110 also has a radially outwardly extending flange 114 that is fastened to the open right end of the second casing member 47 by a bolt or the like.

The propulsive apparatus 10 according to the present embodiment is basically constructed as described above. Operation and advantages of the propulsive apparatus 10 will be described below.

First, an electric current is supplied to the electromagnetic coils 34 of the stator yoke 38 of the propulsive motor 12, causing the electromagnetic coils 34 to produce electromagnetic forces. Now, electromagnetic repulsive and attractive forces are generated between the electromagnetic coils 34 and the magnets 32 of the rotor yoke 30, starting to rotate the rotor shaft 24 about its own axis.

As the rotor shaft 24 rotates, the gear 44 whose outer teeth 45 are held in mesh with (or splined to) the inner teeth 42 of the rotor shaft 24 also rotates about its own axis. Therefore, the two-stage helical gear assembly 52 also rotates about its own axis because the third teeth 58 of the first gear 62 thereof are held in mesh with the first teeth 48 of the gear 44. When the two-stage helical gear assembly 52 rotates, the second gear 64 thereof also rotates, causing the outer member 54 to rotate about its own axis because the second teeth 56 of the larger-diameter portion 100 thereof are held in mesh with the fourth teeth 60 of the second gear 64.

The larger-diameter portion 100 of the outer member 54 is larger in diameter than the second gear 64, as described above. Therefore, the rotational speed of the outer member 54 is smaller than the rotational speed of the second gear 64 depending on the gear ratio between the second gear 64 and the outer member 54. In other words, a speed reduction occurs between the second gear 64 and the outer member 54. Therefore, the larger-diameter portion 100 of the outer member 54 functions as a gear of the speed reducer mechanism 50.

According to the present embodiment, therefore, the outer member 54 of the constant velocity joint 16 doubles as part of the speed reducer mechanism 50. Consequently, the propulsive apparatus 10 is made up of a relatively small number of parts and hence is relatively simple in structure.

When the outer member 54 rotates about its own axis, its rotational force is transmitted to the drive shaft 14 through the inner member 76 whose rollers 84 rollingly engage in the guide grooves 92 defined in the inner wall that defines the bottomed hole 86 of the cup 88. Therefore, the rotational propulsive power from the propulsive motor 12 is transmitted through the constant velocity joint 16 to the drive shaft 14. The rotational propulsive power is subsequently applied through another constant velocity joint, not shown, coupled to the other end of the drive shaft 14 to the drive wheels. In this manner, the electric vehicle which incorporates the propulsive apparatus 10 therein starts to travel.

When the propulsive apparatus 10 is to be serviced for maintenance, the third casing 110 is removed and then the outer member 54 is pulled in the direction indicated by the arrow X away from the second casing member 47. When the outer member 54 is thus pulled, it is easily detached from the second casing member 47. Therefore, the constant velocity joint 16 can easily be dislodged.

The outer member 54 can be manufactured as follows:

First, as shown in FIG. 2A, a substantially cylindrical billet 120 is prepared. The billet 120 may be made of a steel alloy for structural use, such as SCR, SCM, or the like as it can be forged into the outer member 54 of the constant velocity joint 16.

The billet 120 is preheated, coated with a lubricant, and heated, before it is processed by a warm forging process. The warm forging process includes a swaging process and a forward extrusion process.

In the swaging process, the billet 120 is deformed into a shank 90 and a larger-diameter portion 100, as shown in FIG. 2B. Then, the larger-diameter portion 100 is pressed by a punch to extend part thereof into a cup 88 in the forward extrusion process, as shown in FIG. 2C. The punch has lands complementary in shape to the bottomed hole 86 and the guide grooves 92, so that the cup 88 has a bottomed hole 86 with guide grooves 92. The structure thus formed from the billet 120 is referred to as an intermediate.

The intermediate thus produced is then processed by a spheroidizing annealing process, a shot blasting process, and a film lubricant coating process.

Then, the intermediate is ironed by a cold forging process to deform into the cup 88 having, in addition to the larger-diameter portion 100, a medium-diameter portion 102 and a smaller-diameter portion 104, as shown in FIG. 2D. Thereafter, second teeth 56 are formed on the outer circumferential wall surface of the larger-diameter portion 100, thus producing an outer member 54.

In order to produce the outer member of a general tripod constant velocity joint, a billet is processed by four forging processes, i.e., a forward extrusion process, a swaging process, a backward extrusion process, and an ironing process, as disclosed in FIGS. 12A through 12D of Japanese Laid-Open Patent Publication No. 2003-004061. In addition, it is necessary to perform a spheroidizing annealing process, a shot blasting process, and a film lubricant coating process before each of the forward extrusion process, the backward extrusion process, and the ironing process.

According to the present embodiment, the diameter of the larger-diameter portion 100 formed by the swaging process remains substantially the same during the forward extrusion process and the ironing process. Therefore, the outer member 54 of the constant velocity joint 16 can be manufactured more efficiently than the outer member according to the related art.

The present invention is not limited to the above embodiment. Rather, various changes and modifications may be made to the illustrated embodiment without departing from the scope of the present invention.

For example, in the above embodiment, the speed reducer mechanism 50 includes the two-stage helical gear assembly 52. The first gear that is held in mesh with the first teeth 48 and the second gear that is held in mesh with the second teeth 56 may be fitted over a common shaft or respective two shafts that are coupled to each other.

The outer member 54 may be manufactured by cold forging processes only.

What is claimed is:

1. A propulsive apparatus for use in an electric vehicle, comprising;
    a propulsive motor serving as a propulsive source for the electric vehicle;
    a drive shaft;
    a constant velocity joint operatively connecting the propulsive motor and the drive shaft to each other, the constant velocity joint including an inner member fitted over an end of the drive shaft and an outer member housing the inner member therein;
    a gear rotatable by the propulsive motor, the gear having first teeth, and the outer member having a portion with second teeth disposed on an outer wall surface thereof; and
    a speed reducer mechanism operable in response to rotation of the gear, wherein the portion of the outer member with the second teeth disposed thereon serves as a gear of the speed reducer mechanism,
    wherein the speed reducer mechanism includes:
    a first gear having third teeth held in mesh with the first teeth; and
    a second gear having fourth teeth held in mesh with the second teeth,
    wherein the portion of the outer member with the second teeth disposed thereon is larger in diameter than the second gear.

2. The propulsive apparatus according to claim 1, wherein the outer member includes a larger-diameter portion, the second teeth being disposed on the larger-diameter portion.

3. The propulsive apparatus according to claim 1, wherein the propulsive motor has a rotational shaft for rotating the gear, the rotational shaft being of a hollow structure.

4. The propulsive apparatus according to claim 1, wherein the constant velocity joint comprises a tripod constant velocity joint with the inner member slidably housed in the outer member.

5. The propulsive apparatus according to claim 1, wherein the speed reducer mechanism includes a two-stage helical gear assembly with the first gear and the second gear being integral therewith.

\* \* \* \* \*